United States Patent
Takahashi

(10) Patent No.: US 10,628,091 B2
(45) Date of Patent: Apr. 21, 2020

(54) IMAGE FORMING APPARATUS HAVING FUNCTION TO PERFORM AUTHENTICATION PRINTING WITH USER TERMINAL DEVICE THAT DOES NOT HAVE DEDICATED PRINT DRIVER, CONTROL METHOD OF IMAGE FORMING APPARATUS, AND NON-TRANSITORY COMPUTER READABLE STORAGE MEDIUM STORING CONTROL PROGRAM OF IMAGE FORMING APPARATUS

(71) Applicant: KONICA MINOLTA, INC., Chiyoda-ku, Tokyo (JP)

(72) Inventor: Masao Takahashi, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/900,350

(22) Filed: Feb. 20, 2018

(65) Prior Publication Data
US 2018/0246683 A1  Aug. 30, 2018

(30) Foreign Application Priority Data

Feb. 28, 2017  (JP) ................................ 2017-037259

(51) Int. Cl.
*G06F 3/12*  (2006.01)

(52) U.S. Cl.
CPC ............ *G06F 3/1205* (2013.01); *G06F 3/123* (2013.01); *G06F 3/1222* (2013.01); *G06F 3/1228* (2013.01); *G06F 3/1231* (2013.01); *G06F 3/1238* (2013.01); *G06F 3/1267* (2013.01); *G06F 3/1276* (2013.01); *G06F 3/1285* (2013.01)

(58) Field of Classification Search
CPC .... G06F 3/1205; G06F 3/1222; G06F 3/1231; G06F 3/1238; G06F 3/1267; G06F 3/1285
USPC .................................................. 358/1.13, 1.15
See application file for complete search history.

(56) References Cited

U.S. PATENT DOCUMENTS

| | | | |
|---|---|---|---|
| 2003/0105643 A1* | 6/2003 | Chen ....................... | G06Q 10/02 358/1.15 |
| 2006/0056306 A1* | 3/2006 | Iwai ................... | H04L 29/12216 370/252 |
| 2006/0274370 A1* | 12/2006 | Shima ................... | G06F 3/1204 358/1.15 |
| 2013/0268624 A1* | 10/2013 | Yagiura ................... | H04L 67/10 709/217 |

(Continued)

FOREIGN PATENT DOCUMENTS

JP  2012208960 A  10/2012

*Primary Examiner* — Jamares Q Washington
(74) *Attorney, Agent, or Firm* — Holtz, Holtz & Volek PC

(57) ABSTRACT

An image forming apparatus, in a case a user is authenticated, allocates a sub address provided under the network address of the image forming apparatus to the user, outputs destination information including the network address and the sub address along with a job file for setting to the outside, in a case the job file for setting is received, associates the sub address and identification information of the user with one another, in a case the sub address and the identification information of the user are associated with one another, associates the printing data with the identification information of the user, and stores the printing data on a storage.

10 Claims, 7 Drawing Sheets

(56) References Cited

U.S. PATENT DOCUMENTS

2016/0134764 A1* 5/2016 Oguma ................ G06F 3/1239
358/1.14

* cited by examiner

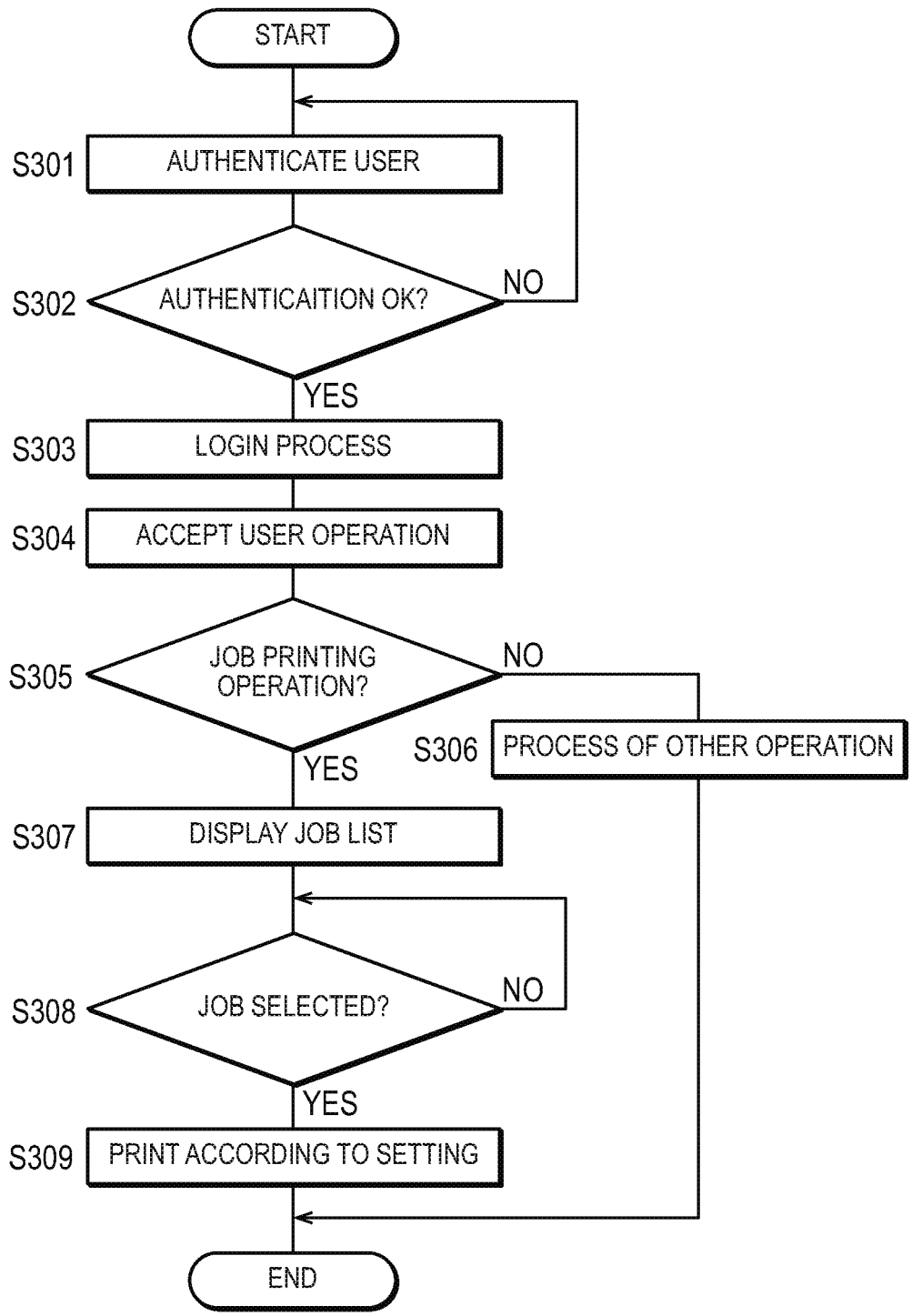

IMAGE FORMING APPARATUS HAVING FUNCTION TO PERFORM AUTHENTICATION PRINTING WITH USER TERMINAL DEVICE THAT DOES NOT HAVE DEDICATED PRINT DRIVER, CONTROL METHOD OF IMAGE FORMING APPARATUS, AND NON-TRANSITORY COMPUTER READABLE STORAGE MEDIUM STORING CONTROL PROGRAM OF IMAGE FORMING APPARATUS

CROSS-REFERENCE TO RELATED APPLICATION

The entire disclosure of Japanese Patent Application No. 2017-037259 filed on Feb. 28, 2017, is incorporated herein by reference in its entirety.

BACKGROUND

1. Technological Field

The present invention relates to an image forming apparatus, a control method of an image forming apparatus, and a non-transitory computer readable storage medium storing a control program of an image forming apparatus.

2. Description of the Related Art

As a function of a Multi-Function Peripheral (MFP), there is an authentication printing function that, when an MFP receives printing data, saves the printing data without performing the printing, and the printing is started after the user is authenticated on the MFP side (for example, JP 2012-208960 A).

In order to perform an authentication printing, generally a printing must be instructed through a terminal device such as a personal computer (PC), a smart phone, or the like, using a dedicated printer driver for the MFP, against the MFP that has an authentication printing function.

Therefore, it is a problem that an authentication printing cannot be performed by a terminal device to which a dedicated printer driver for the MFP utilized for authentication printing is not developed, or by a terminal device that is restricted in using a printer driver other than a common printer driver that is capable of handling multiple types of MFPs.

SUMMARY

The present invention is made in consideration of the above-mentioned problem. Therefore, an object of the present invention is to provide an image forming apparatus, a control method of an image forming apparatus, and a non-transitory computer readable storage medium storing a control program of an image forming apparatus, which are capable of performing a printing utilizing the user authentication with a terminal device to which a dedicated printer driver is not provided or a terminal device in an environment that a dedicated printer driver is not available.

To achieve at least one of the above-mentioned objects, according to an aspect of the present invention, an image forming apparatus reflecting one aspect of the present invention is an image forming apparatus connected to a network, including: an acceptor that accepts authentication information of a user; a hardware processor that: in a case the user is authenticated, allocates a sub address provided under a network address of the image forming apparatus to the user, and allows an interface to output, with a job file for setting, the destination information including the sub address and the network address to the outside; in a case the job file for setting having the sub address as a destination is received by the interface, associates the sub address and identification information of the user with one another; and in a case printing data having the sub address as a destination is received by the interface, if the sub address and the identification information of the user are associated with one another, associates the printing data with the identification information of the user and stores the printing data on a storage; and an image former that forms an image on a basis of the printing data associated with the identification information of the user and stored on the storage, in a case the user is authenticated.

To achieve at least one of the above-mentioned objects, according to another aspect of the present invention, a control method of the image forming apparatus reflecting another aspect of the present invention is a control method of an image forming apparatus connected to a network, including: (a) accepting authentication information of a user; (b) in a case the user is authenticated, allocating a sub address provided under a network address of the image forming apparatus to the user; (c) outputting, along with a job file for setting, destination information including the sub address and the network address to the outside; (d) receiving the job file for setting having the sub address as a destination; (e) in a case the job file for setting is received, associating the sub address and identification information of the user with one another; (f) receiving printing data having the sub address as a destination; (g) in a case the sub address and the identification information of the user are associated with one another, associating the printing data with the identification information of the user and storing the printing data on a storage; (h) accepting authentication information of the user; and (i) in a case the user is authenticated, forming an image on a basis of the printing data associated with the identification information of the user and stored on the storage.

To achieve at least one of the above-mentioned objects, according to further another aspect of the present invention, a non-transitory computer readable storage medium storing a control program of an image forming apparatus reflecting further another aspect of the present invention is a non-transitory computer readable storage medium storing a control program of an image forming apparatus connected to a network, the program causing the image forming apparatus to perform: (a) accepting authentication information of a user; (b) in a case the user is authenticated, allocating a sub address provided under a network address of the image forming apparatus to the user; (c) outputting, along with a job file for setting, destination information including the sub address and the network address to the outside; (d) receiving the job file for setting having the sub address as a destination; (e) in a case the job file for setting is received, associating the sub address and identification information of the user with one another; (f) receiving printing data having the sub address as a destination; (g) in a case the sub address and the identification information of the user are associated with one another, associating the printing data with the identification information of the user and storing the printing data on a storage; (h) accepting authentication information of the user; and (i) in a case the user is authenticated, forming an image on a basis of the printing data associated with the identification information of the user and stored on the storage.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 9 is a flowchart showing a procedure of a printing process.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
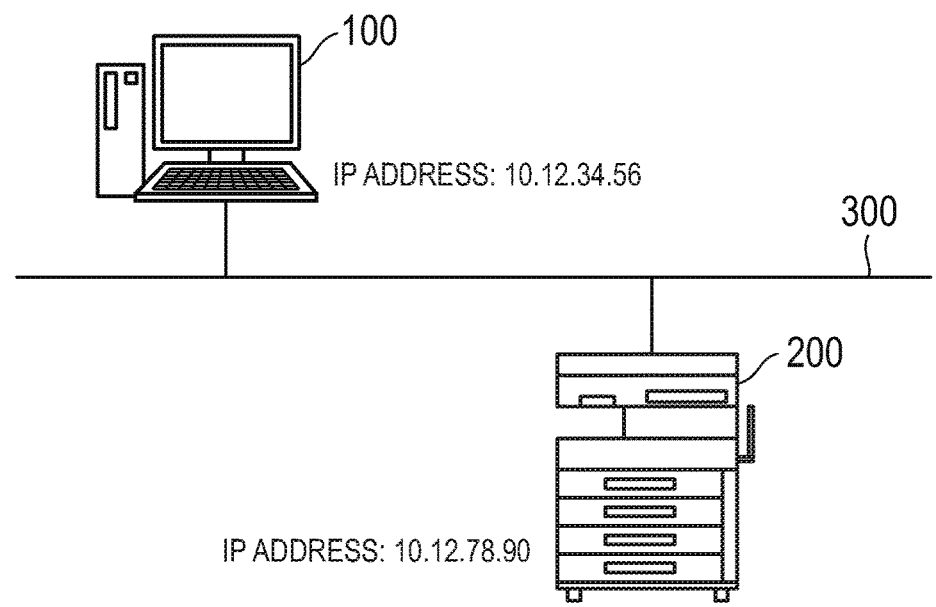
FIG. 1 is a diagram showing an overall structure of the printing system on which the image forming apparatus according to an embodiment of the present invention is applied.

FIG. 1 is a diagram showing an overall structure of the printing system on which the image forming apparatus according to an embodiment of the present invention is applied. The printing system includes a PC 100 as a terminal device and an MFP 200 as an image forming apparatus. The PC 100 and the MFP 200 are communicatively coupled to one another via a network 300.

The network 300 is a Local Area Network (LAN) that connects computers and network devices to each other by a standard such as Ethernet, Fiber Distributed Data Interface (FDDI), or Wireless Fidelity (Wi-Fi), Wide Area Network (WAN) that connects LANs via dedicated lines, or the like. The types and number of the devices connected to the network 300 are not limited to the example shown in FIG. 1.

Figure 2:
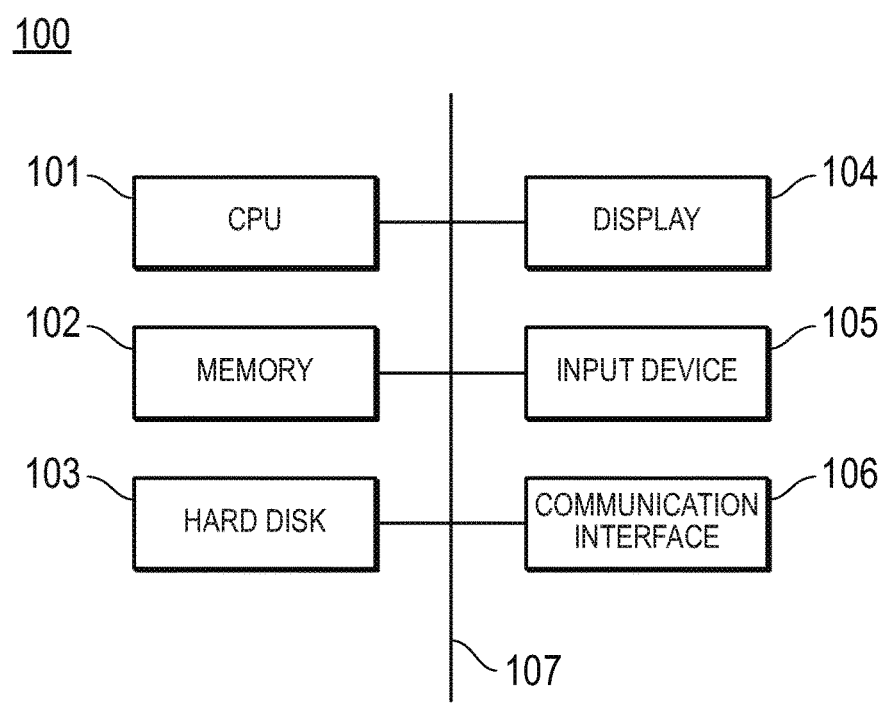
FIG. 2 is a block diagram showing a schematic structure of a PC.

FIG. 2 is a block diagram showing a schematic structure of the PC 100. The PC 100 includes a Central Processing Unit (CPU) 101, a memory 102, a hard disk 103, a display 104, an input device 105, and a communication interface 106, and these are coupled to one another via a bus 107 in order to exchange signals.

The CPU 101 controls each of the above-mentioned units and performs various computation processes according to a program.

The memory 102 includes a Read Only Memory (ROM) for preliminarily storing various programs and various data, a Random Access Memory (RAM) for temporarily storing a program and data as a working area, an Electrically Erasable and Programmable Read Only Memory (EEPROM) that is an electrically rewritable nonvolatile memory, and the like.

The hard disk 103 stores various programs including an operating system (OS) and various data. A common printer driver (Universal Printer Driver: UPD) that is capable of handling a plurality of types of image forming apparatuses (MFP/Printer) is installed on the hard disk 103.

The display 104 is, for example, a liquid crystal display, and displays various information.

The input device 105 includes a pointing device such as a mouse and a keyboard, and is used for performing various inputs.

The communication interface 106 is an interface for communicating with other devices via the network 300, and a standard such as Ethernet, FDDI, or Wi-Fi is utilized.

Figure 3:
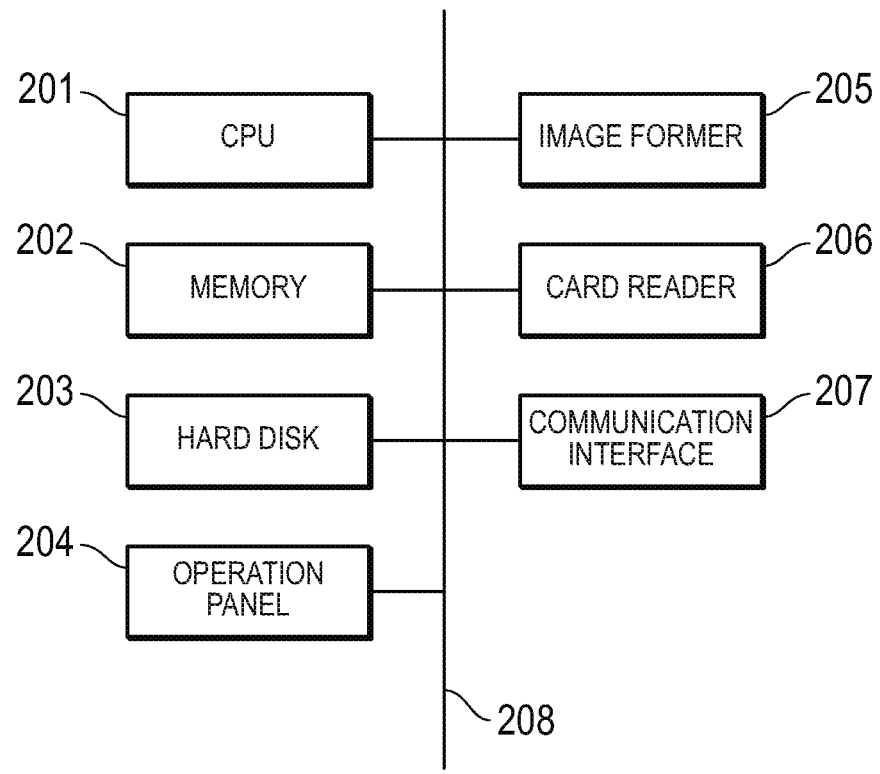
FIG. 3 is a block diagram showing a schematic structure of an MFP.

FIG. 3 is a block diagram showing a schematic structure of the MFP 200. The MFP 200 includes a CPU 201, a memory 202, a hard disk 203, an operation panel 204, an image former 205, a card reader 206, and a communication interface 207, and these are coupled to one another via a bus 208 in order to exchange signals. Here, among the above-described units of the MFP 200, the descriptions of the units that have the same function as the above-described units of the PC 100 are omitted to avoid overlapping description.

The operation panel 204 includes a touch panel, a numeric keypad, a start button, a stop button, and the like, and is used for displaying various information and inputting various instructions.

The image former 205 forms an image based on various data on a recording sheet such as a sheet of paper, utilizing a known image formation process such as electrophotographic process including steps of charging, exposure, development, transfer, and fixing.

The card reader 206 is used for reading authentication information stored on an Integrated Circuit (IC) card and the like.

On the memory 202 of the MFP 200, information about a registered user of the MFP 200, and various setting information such as network setting and the like are stored. Also, on the hard disk 203 of the MFP 200, printing data is associated with the identification information of the user and is stored.

The operation panel 204 and the card reader 206 of the MFP 200 function as an acceptor that accepts authentication information of a user. The communication interface 207 of the MFP 200 functions as an output unit that outputs a job file for setting to the outside by an e-mail, and also functions as a first and a second receiving units that receive a job file for setting and printing data.

The CPU 201 of the MFP 200 functions as an allocation unit, association unit, and a storage control unit by executing a program stored on the hard disk 203. Here, the allocation unit allocates a port number (sub address) of the MFP 200 to a user in a case the user is authenticated. The association unit associates an Internet Protocol (IP) address of the sender of the job file for setting, the identification information of the user, and the port number with one another in a case the job file for setting is received. The storage control unit associates the printing data with the identification information of the user, and stores the printing data on the hard disk 203, in a case the printing data is received. The detailed processing content of each unit will be described later.

The PC 100 and the MFP 200 may include other components than the above-described components, or may not include some of the above-described components.

In the printing system configured as the above, a user of the PC 100 can use the authentication printing function of the MFP 200 when a dedicated printer driver for the MFP 200 is not installed on the PC 100. Hereinafter, an operation of the MFP 200 in a case an authentication printing is performed is described in details with reference to FIG. 4 to FIG. 9.

Figure 4:
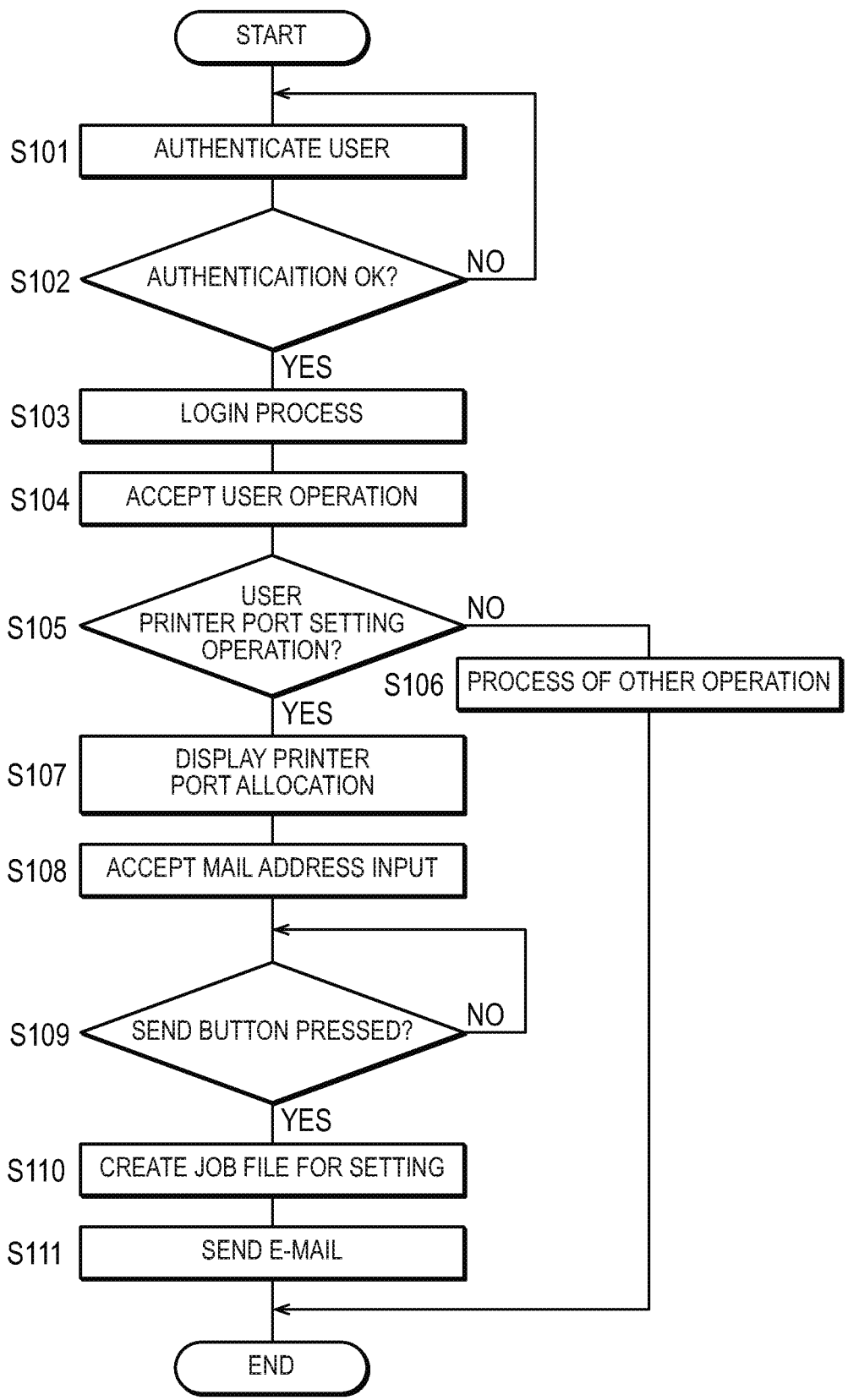
FIG. 4 is a flowchart showing a procedure of a port allocation process.

FIG. 4 is a flowchart showing a procedure of a port allocation process performed by the MFP 200. Prior to the port allocation process, the MFP 200 accepts authentication information of a user. The authentication information of a user is accepted in a case a user of the PC 100 makes the card reader 206 read an IC card, or in a case the user inputs a user name and a password through the operation panel 204.

When the authentication information of a user is accepted, the MFP 200 performs a user authentication (step S101). Specifically, the CPU 201 of the MFP 200 determines whether the accepted authentication information matches the authentication information of the user registered on the memory 202 or not. In addition, unlike the present embodiment, the user authentication may be performed by an external server.

Then, the MFP 200 determines whether the user authentication succeeded or not (step S102). When it is determined that the user authentication did not succeed (step S102: NO), the MFP 200 returns to the process of step S101.

On the other hand, when it is determined that the user authentication succeeded (step S102: YES), the MFP 200 performs a login process (step S103). As a result, the user of the PC 100 is allowed to use the MFP 200, and, for example, a dedicated setting screen for the user is displayed on the operation panel 204.

Then, the MFP 200 accepts a user operation inputted through the operation panel 204 (step S104). Then, the MFP 200 determines whether the user operation inputted through the operation panel 204 is a user printer port setting operation or not (step S105).

When it is determined that the user operation is not the user printer port setting operation (step S105: NO), the MFP 200 performs another process according to the user operation (step S106), and terminates the process.

On the other hand, when it is determined that the user operation is the user printer port setting operation (step S105: YES), the MFP 200 displays user printer port allocation (step S107). Specifically, the CPU 201 of the MFP 200 allocates a port number of the MFP 200 to the user who is currently logged in. Then, the CPU 201 displays a user printer port setting screen 400 (refer to FIG. 5) that shows a port number allocated to the user and the like on the operation panel 204.

Figure 5:
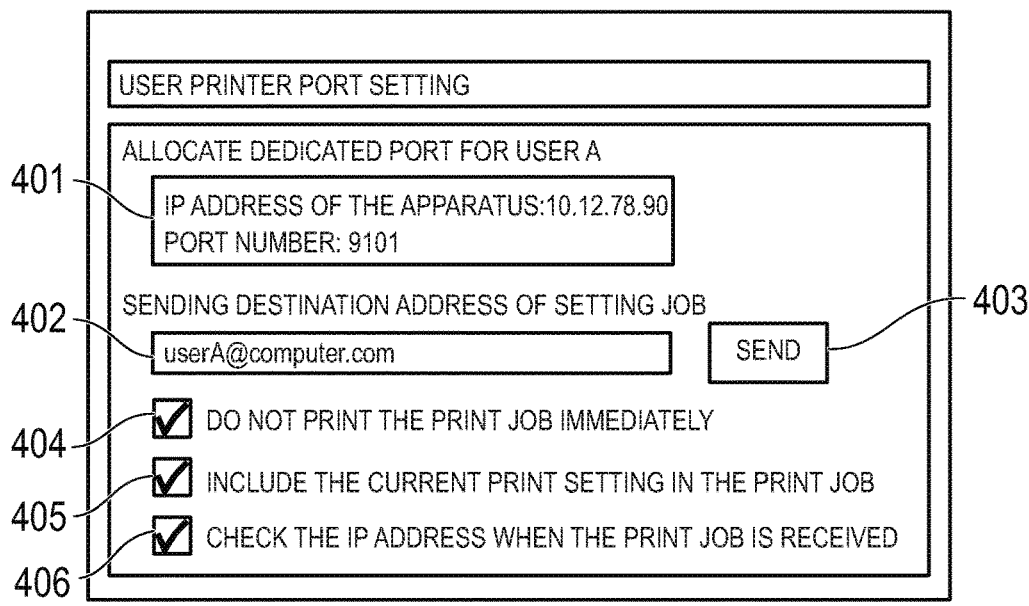
FIG. 5 is a diagram showing an example of a user printer port setting screen.

FIG. 5 is a diagram showing an example of the user printer port setting screen 400. The user printer port setting screen 400 includes a destination information display portion 401, a mail address input portion 402, a send button 403, a first check box 404, a second check box 405, and a third check box 406.

The destination information display portion 401 displays the IP address of the MFP 200 and the port number allocated to the user. The mail address input portion 402 accepts an input of an e-mail address of the user. The send button 403 is used for sending an e-mail to the e-mail address inputted in the mail address input portion 402.

The first to third check boxes 404 to 406 accept a setting related to an outputting of the printing data. The first check box 404 accepts a setting whether, in a case MFP 200 receives printing data, the printing is performed immediately or saving the printing data without performing printing. The second check box 405 accepts a setting whether the current print setting of the MFP 200 is applied to the printing data as a default print setting or not. The third check box 406 accepts a setting whether, in a case MFP 200 receives printing data, the IP address of the PC that sent the printing data is checked or not.

In the process shown in step S107, when the user print port setting screen 400 is displayed on the operation panel 204, the user can recognize the IP address of the MFP 200 and the port number allocated to himself. Here, the port number allocated to the user may be predetermined for each registered user, or determined when the user printer port setting screen 400 is displayed.

Then, the MFP 200 accepts input of an e-mail address into the mail address input portion 402 of the user printer port setting screen 400 (step S108). Here, the e-mail address may be inputted directly by the user, or may be inputted automatically according to information registered on the memory 202 or the information of the IC card.

Then, the MFP 200 determines whether the send button 403 of the user printer port setting screen 400 is pressed or not (step S109). When it is determined that the send button 403 is not pressed (S109: NO), the MFP 200 waits until the send button 403 is pressed.

On the other hand, when it is determined that the send button 403 is pressed (step S109: YES), the MFP 200 creates a job file for setting (step S110). Specifically, the CPU 201 of the MFP 200 creates a job file for setting to be sent to the user on the basis of the content of the first to third check boxes 404 to 406 of the user printer port setting screen 400. In a case the first check box 404 is checked, the CPU 201 writes, on the job file for setting, information for the MFP 200 to be set to save the printing data without performing printing when printing data is received from the PC 100. In a case the second check box 405 is checked, the CPU 201 writes, on the job file for setting, information showing the current print setting of the MFP 200 (duplex printing, color printing, etc.) and information for the MFP 200 to be set to apply, as the default print setting, the current print setting to the printing data. In a case the third check box 406 is checked, the CPU 201 writes, on the job file for setting, information for the MFP 200 to be set to check the IP address of the PC that sent the printing data when printing data is received from the PC 100. This information is, for example, written on a job file for setting, using a page description language such as PostScript or the like.

Then, the MFP 200 attaches a job file for setting to the e-mail in which the destination information such as the port number allocated to the user and the like is written, and sends the e-mail to the user (step S111), and terminates the process.

As described above, with the process shown in the flowchart of FIG. 4, after the user is authenticated, if the user print port setting operation is performed, a port number is allocated to the authenticated user. Moreover, when the e-mail address of the user is inputted and the send button 403 is pressed, the job file for setting is created, and is sent to the user with the destination information such as the port number and the like. The user confirms the content of the e-mail, for example, on the PC 100.

Figure 6:
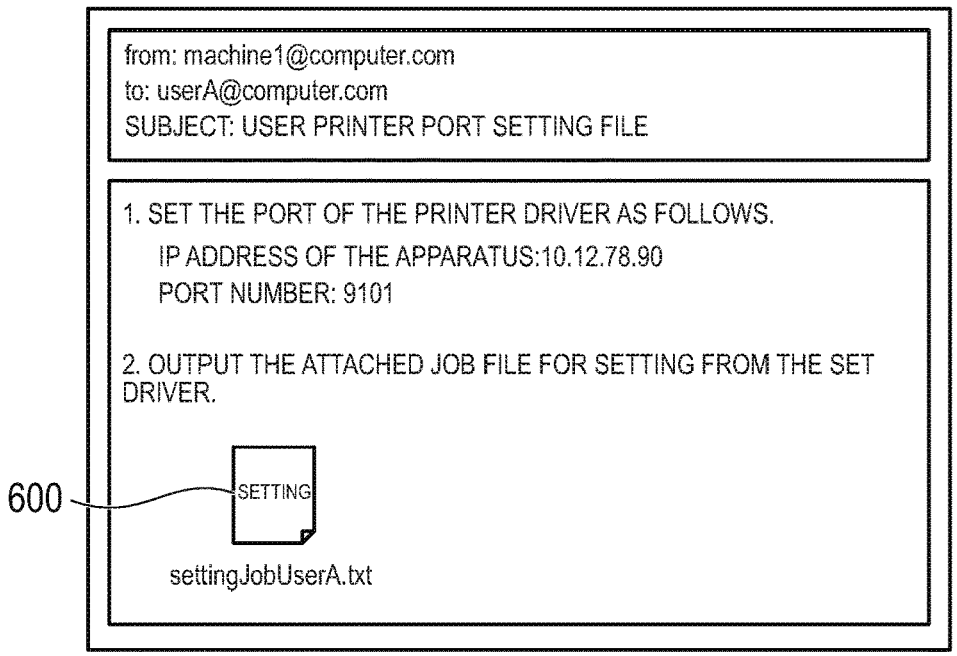
FIG. 6 is a diagram showing an example of an e-mail screen.

FIG. 6 is a diagram showing an example of an e-mail screen 500 displayed on the display 104 of the PC 100. The e-mail screen 500 displays an IP address (10.12.78.90) of the MFP 200 and a port number (9101) allocated to the user. On the e-mail screen 500, a job file for setting 600 is attached. Here, the file name of the job file for setting 600 (setting-JobUserA) is used as identification information for distinguishing the job file for setting from other data, or identification information for identifying the user.

The user who sees the e-mail screen 500 sets the output destination port of the common printer driver installed on the PC 100, according to the content of the e-mail. Then, when the user instructs the printing of the job file for setting to the MFP 200 using the common printer driver, the job file for setting is sent to the MFP 200. Hereinafter, an operation of the MFP 200 when the job file for setting is received is described with reference to FIG. 7 and FIG. 8. Here, a case that the job file for setting 600 is sent to the MFP 200 without being changed is described as an example, for the simplicity of the description.

Figure 7:
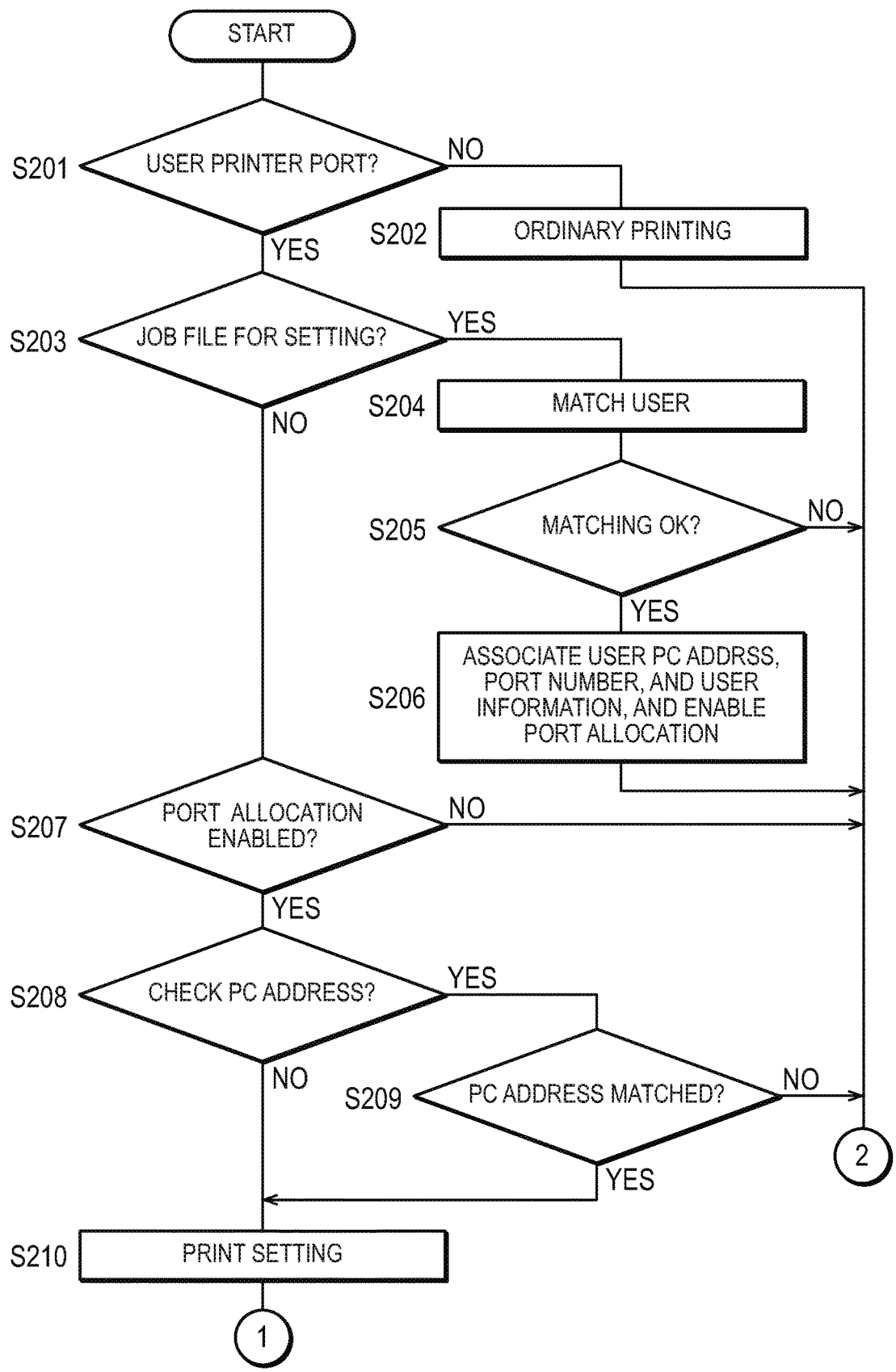
FIG. 7 is a flowchart showing a procedure of a job execution process.
Figure 8:
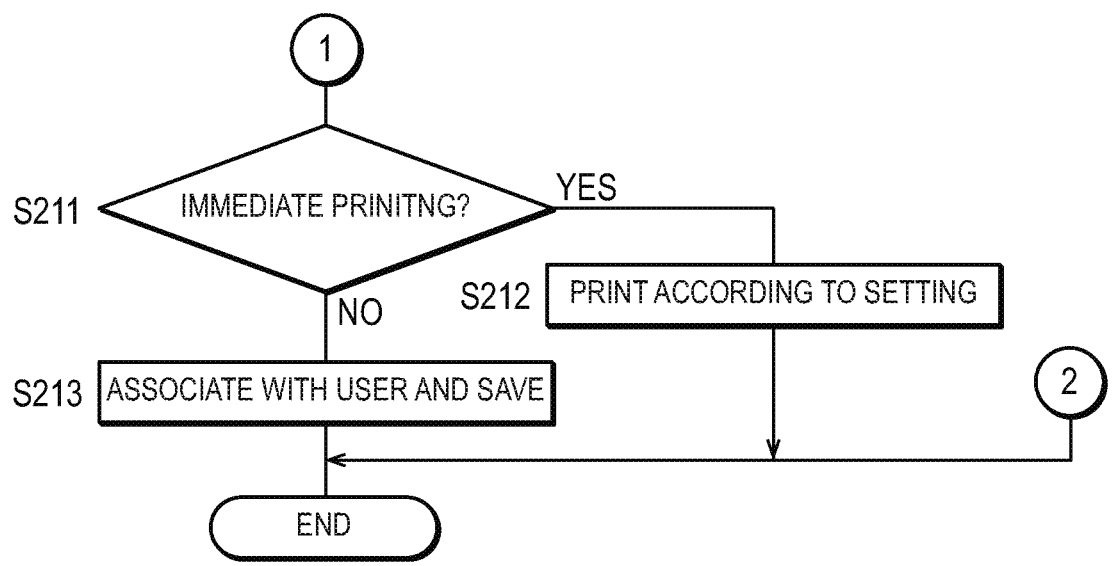
FIG. 8 is a subsequent flowchart of FIG. 7.

FIG. 7 and FIG. 8 are flowcharts showing a procedure of a job execution process performed by the MFP 200. Prior to the job execution process, the MFP 200 receives the printing data or the job file for setting.

When the data is received, the MFP 200 determines whether the received data is the data having the user printer port as the destination or not (step S201). More specifically, the CPU 201 of the MFP 200 determines whether the received data is the data having the printer port with the port number allocated to the user as the destination or not.

When it is determined that the received data is not the data having the user printer port as the destination (step S201: NO), the MFP 200 performs an ordinary printing by regarding the received data as general printing data (step S202), and terminates the process.

On the other hand, when it is determined that the received data is the data having the user printer port as the destination (step S201: YES), the MFP 200 determines whether the received data is the job file for setting or not (step S203). Specifically, the CPU 201 of the MFP 200 determines whether the received data is the job file for setting or not, by determining whether identification information for distinguishing the job file for setting from other data is included in the data. Here, in the present embodiment, the identification information of the job file for setting is included in the file name of the job file for setting. However, unlike the present embodiment, the identification information of the job file for setting may be included in the content of the job file for setting.

When it is determined that the received data is not the job file for setting (step S203: NO), the MFP 200 proceeds to the process of step S207.

On the other hand, when it is determined that the received data is the job file for setting (step S203: YES), the MFP 200 performs user matching (step S204). Specifically, the CPU 201 of the MFP 200 refers to the file name of the job file for setting, and determines whether the identification information of the user included in the file name (User A) matches the identification information of the user to whom the port number is allocated or not.

Then, the MFP 200 determines whether the matching succeeded or not (step S205). When it is determined that the matching did not succeed (step S205: NO), the MFP 200 terminates the process.

On the other hand, when it is determined that the matching succeeded (step S205: YES), the MFP 200 associates the identification information of the user, the port number allocated to the user, and the IP address of the PC with one another, and enables port allocation (step S206), and terminates the process. More specifically, at first, the CPU 201 of the MFP 200 recognizes the IP address (10.12.34.56) of the PC 100 that is the sender of the job file for setting. Then, the CPU 201 enables the port allocation after associating the IP address of the PC 100 with the identification information of the user (User A) and the port number allocated to the user (9101), and storing the IP address on the hard disk 203. At this time, the setting related to an outputting of the printing data included in the job file for setting is stored on the hard disk 203 as the default setting of the user. For example, in a case the print setting of the MFP 200 at the time the job file for setting is created is set to be applied to the printing data as the default print setting, the information showing the print setting is stored on the hard disk 203.

As described above, with the process shown in the steps S201 to S206 of FIG. 7, in the case the job file for setting having the port number allocated to the user as the destination is received, user matching is performed. Then, when the user matching succeeds, the identification information of the user and the port number allocated to the user and the IP address of the sender of the job file for setting are associated with one another. The process shown in steps S204 to S205 may be omitted. Whether the process shown in steps S204 to S205 are omitted or not may be selected by the user through the user printer port setting screen 400, for example.

On the other hand, in the process shown in step S203, when it is determined that the received data is not the job file for setting (step S203: NO), the MFP 200 assumes that the received data is the printing data, and determines whether the port allocation is enabled or not (step S207). More specifically, the CPU 201 of the MFP 200 determines whether the job file for setting was received in the past and the IP address of the PC 100 that sent the job file for setting is associated with the port number and the identification information of the user, and then port allocation is enabled or not.

When it is determined that the port allocation is not enabled (step S207: NO), the MFP 200 terminates the process.

On the other hand, when it is determined that the port allocation is enabled (step S207: YES), the MFP 200 determines whether to check the IP address of the sender PC or not (step S208). More specifically, the CPU 201 of the MFP 200 determines whether to check the IP address of the PC that sent the printing data, by referring to the setting related to an outputting stored on the hard disk 203.

When it is determined that the IP address of the sender PC is not checked (step S208: NO), the MFP 200 proceeds to the process of step S210. On the other hand, when it is determined that the IP address of the sender PC is checked (step S208: YES), the MFP 200 determines whether the IP address of the sender PC matches or not (step S209). More specifically, at first, the CPU 201 of the MFP 200 recognizes the IP address of the PC that sent the printing data. Then, the CPU 201 determines whether the IP address of the PC that sent the printing data is identical to the IP address of the PC 100 that is associated with the port number.

When it is determined that the IP address of the sender PC does not match (step S209: NO), the MFP 200 terminates the process.

On the other hand, when it is determined that the IP address of the sender PC matches (step S209: YES), the MFP 200 performs a print setting (step S210). For example, if the print setting of the MFP 200 at the time the job file for setting is created is set to be applied to the printing data as the default print setting, the CPU 201 of the MFP 200 applies the print setting shown by the information stored on the hard disk 203 to the printing data.

Then, the MFP 200 determines whether it is an immediate printing or not (step S211). More specifically, the CPU 201 of the MFP 200 determines whether to perform the printing based on the printing data immediately or to save the printing data without performing printing, by referring to the setting related to an outputting stored on the hard disk 203.

When it is determined that it is an immediate printing (step S211: YES), the MFP 200 performs the printing according to the print setting (step S212), and terminates the process.

On the other hand, when it is determined that it is not an immediate printing (step S211: NO), the MFP 200 associates the printing data with the identification information of the user and stores the printing data on the hard disk 203 (step S213), and terminates the process.

As described above, with the process shown in the steps S207 to S213 of FIG. 7 and FIG. 8, in the case the printing data having the port number allocated to the user as the destination is received, it is determined whether the IP address of the PC is associated with the port number and the like. Then, if the IP address of the PC is associated with the port number and the like, it is determined whether the immediate printing is set or not. If the immediate printing is not set, the printing data is associated with the identification information of the user and stored on the hard disk 203.

If the IP address checking of the PC that sent the printing data is set, the IP address of the PC that sent the printing data is checked, and if the IP address of the sender PC does not match the IP address associated with the port number, the process terminates.

Then, with reference to FIG. 9, an operation of the MFP 200 that preforms a printing on the basis of the printing data stored on the hard disk 203 is described.

FIG. 9 is a flowchart showing a procedure of a printing process executed by the MFP 200. Prior to the printing process, the MFP 200 accepts the authentication information of the user.

The process of steps S301 to S304 in FIG. 9 is the same as the process of steps S101 to S104 in FIG. 4, so the detailed description is omitted.

Then, the MFP 200 determines whether the user operation inputted through the operation panel 204 is a job printing operation or not (step S305). When it is determined that the user operation is not the job printing operation (step S305: NO), the MFP 200 performs another process according to the user operation (step S306), and terminates the process.

On the other hand, when it is determined that the user operation is the job printing operation (step S305: YES), the MFP 200 displays a list of jobs that are associated with the identification information of the user and stored on the hard disk 203 on the operation panel 204 (step S307).

Then, the MFP 200 determines whether a job to be printed is selected from the list of jobs by the user operation or not (step S308).

When it is determined that a job is not selected (step S308: NO), the MFP 200 waits until a job is selected. On the other hand, when it is determined that a job is selected (step S308: YES), the MFP 200 performs the printing according to the print setting (step S309), and terminates the process.

As described above, with the process shown in the flow-chart of FIG. 9, after the user is authenticated, if the job printing operation is performed, a list of jobs that are associated with the authenticated user and stored on the hard disk 203 is displayed on the operation panel 204. Then, when a job is selected by the user operation, a printing based on the printing data is performed. Here, when the job is selected and printing is performed, the user may operate the operation panel 204 and modify the print setting. With this configuration, the print settings provided by the MFP 200 can be specified against the printing data that has been sent using a common printer driver, and all the functions of the MFP 200 can be utilized.

Moreover, with the present embodiment, even if a dedicated printer driver for the MFP 200 is not installed on the PC 100, if the common printer driver is installed, the PC 100 can perform an authentication printing using the MFP 200. That is, with a PC that is in an environment where a dedicated printer driver for the MFP 200 cannot be used, or with a PC (OS) to which a dedicated printer driver for the MFP 200 is not provided, if instructing a printing for a standard image forming apparatus is possible, an authentication printing can be performed.

Also, with the present embodiment, when a job file for setting is sent to the user from the MFP 200, only after the user replies with a job file for setting to the MFP 200 from the PC 100, the authentication printing becomes possible. Thus, the user can understand that he can perform the authentication printing with the MFP 200, and the user can avoid performing the authentication printing without understanding whether he can perform the authentication printing or not.

Also, with the present embodiment, whether the IP address of the PC that sent the printing data is identical to the IP address of the PC 100 that is associated with the port number and the like (that is to say, the IP address of the sender of the job file for setting) or not is determined. Thus, a printing instruction from a PC that has a different IP address to the MFP 200 is prevented. As a result, for example, in a case of a paid printing, if a different user from the user to whom the port number is allocated specifies the port number and instructs the printing to the MFP 200 from a different PC, the printing is not performed, and a charging is prevented.

Also, with the present embodiment, when the job file for setting is created, the current print setting of the MFP 200 is written on the job file for setting. Moreover, the print setting written on the job file for setting is stored on the MFP 200 at the time the port number, the identification information of the user, and the IP address of the PC 100 are associated with one another. Thus, when the common printer driver is used to instruct the printing to the MFP 200, the print setting provided by the MFP 200 can be specified, and all the functions of the MFP 200 can be utilized. Also, the print setting according to the user preference can be easily applied to the printing data.

(Modification)

The job file for setting may have an expiration date or a valid number of times. Specifically, for example, if the MFP 200 sets an expiration date when the job file for setting is created, and the job file for setting is received after the expiration date, the association of port number and the like is not performed. With this configuration, if an e-mail attached with the job file for setting is leaked, if the expiration date has expired, the case that the user other than the user to whom the port number is allocated impersonates the user to whom the port number is allocated, and performs the authentication printing, is prevented. Also, if a plurality of valid number of times is set to a job file for setting, after the user sends the job file for setting to the MFP 200 from the PC 100, the user can change the PC associated with the port number and the identification information of the user by resending the job file for setting to the MFP 200 from a different PC.

Also, an expiration date can be set for the period of time the IP address of the PC and the port number and the identification information of the user are associated with one another. Alternatively, a valid number of times of receiving the printing data under the condition that the IP address of the PC and the port number and the identification information of the user are associated with one another can be set. For example, if the expiration date is set to 1 day, a case that the IP address allocated to the PC of the user changes every day can be handled.

Also, a plurality of IP addresses may be allocated to the MFP 200. With this configuration, if the number of users increases, the port number will not be lacking.

The present invention is not limited to the above-described embodiments, and various modifications are possible within the scope of the claims.

For example, in the above-described embodiment, in a case the MFP 200 receives a job file for setting, the IP address of the PC 100 and the port number and the identification information of the user are associated with one another. However, the IP address of the PC 100 may not be associated with the port number and the identification information of the user. In this case, when the MFP 200 receives a job file for setting, the port number and the identification information of the user are associated with one another. Moreover, in a case the MFP 200 receives the printing data having the port number allocated to the user as the destination, if the port number and the identification information of the user are associated with one another, the MFP 200 associates the printing data with the identification information of the user, and stores the printing data on the hard disk 203.

Whether the IP address of the PC 100 is associated with the identification information of the user and the port number or not may be selected by the user, through the user printer port setting screen 400. In the case the IP address of the PC 100 is not associated with the port number and the like, the printing instruction from a PC having a different IP address to the MFP 200 cannot be prevented, so it is desirable that the MFP 200 is set not to be able to perform an immediate printing. Also, when the expiration date is set to the period of time that the IP address of the PC 100 is associated with the port number and the like, it is desirable that the MFP 200 is set not to be able to perform an immediate printing after the expiration date expires.

In the above-described embodiment, the job file for setting is sent by an e-mail to the user with the destination information such as the port number and the like. However, the job file for setting may not be outputted to the outside by the e-mail, and may be outputted to a shared folder on the network 300 with the destination information, for example.

In the above-described embodiment, when the user is authenticated, the port number of the MFP 200 is allocated to the user. However, the sub address of the MFP 200 that is allocated to the user is not limited to the port number. In a case a printing is performed using the Line PRinter daemon protocol (LPR), a queue name is allocated as the sub address.

In the above-described embodiment, the case that the MFP 200 performs the authentication printing (secure printing) is described as an example of the printing utilizing the user authentication. However, the printing utilizing the user authentication is not limited to the authentication printing. For example, the MFP 200 is applied to a serverless ubiquitous printing, a paid printing per user, and also to saving in a box. If the MFP 200 is applied to a serverless ubiquitous printing, the MFP 200 functions as a base unit including a server function.

The units and method for performing various processes on the MFP 200 according to the above-described embodiments are able to be realized by ether a dedicated hardware circuit or a programmed computer. The above-described program may be provided in a non-transitory computer readable storage medium such as a Compact Disc Read Only Memory (CD-ROM), or may be provided online via a network such as the Internet. In this case, a program stored on a non-transitory computer readable storage medium is usually transferred to a storage such as a hard disk and stored on the storage. Also, the above-described program may be provided as independent application software, or may be integrated in software of the MFP 200 as a function of the MFP 200.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus connected to a network, comprising:
   a hardware processor that:
      accepts authentication information input by a user at the image forming apparatus;
      in a case in which the user is authenticated based on the input authentication information, allocates a sub address provided under a network address of the image forming apparatus to the user, creates a job file including setting information related to performing a print job, and transmits, via an interface, the job file including the setting information along with destination information including the sub address and the network address to an external device operable by the user;
      in a case in which the job file including the setting information and having the sub address as a destination is received via the interface from the external device operated by the user, associates the sub address and identification information of the user with one another; and
      in a case in which printing data having the sub address as a destination is received via the interface, if the sub address and the identification information of the user are associated with one another, associates the printing data with the identification information of the user and stores the printing data on a storage; and
   an image former that forms an image based on the printing data associated with the identification information of the user and stored on the storage, in a case in which the user is authenticated.

2. The image forming apparatus as claimed in claim 1, wherein:
   in the case in which the job file is received via the interface, the processor further associates a network address of a sender of the job file with the sub address and the identification information of the user; and
   in a case in which the network address of the sender is associated with the sub address and the identification information of the user, the processor associates the printing data with the identification information of the user and stores the printing data on the storage.

3. The image forming apparatus as claimed in claim 1, wherein identification information for distinguishing the job file from other data is included in a name or a content of the job file.

4. The image forming apparatus as claimed in claim 1, wherein an expiration date or a valid number of times is set to the job file.

5. The image forming apparatus as claimed in claim 1, wherein a plurality of network addresses are allocated.

6. The image forming apparatus as claimed in claim 1, wherein:
  the setting information included in the job file includes a setting related to an outputting of printing data;
  in the case in which the job file is received via the interface, the processor associates the setting with the identification information of the user and stores the setting on the storage; and
  in the case in which the printing data is received by the interface, the setting is applied to the printing data.

7. A control method of an image forming apparatus connected to a network, comprising:
  (a) accepting authentication information input by a user at the image forming apparatus;
  (b) in a case in which the user is authenticated based on the input authentication information, allocating a sub address provided under a network address of the image forming apparatus to the user;
  (c) creating a job file including setting information related to performing a print job;
  (d) outputting the job file including the setting information along with destination information including the sub address and the network address to an external device operable by the user;
  (e) receiving the job file including the setting information and having the sub address as a destination, from the external device operated by the user;
  (f) in a case in which the job file including the setting information and having the sub address as a destination is received from the external device operated by the user, associating the sub address and identification information of the user with one another;
  (g) receiving printing data having the sub address as a destination;
  (h) in a case in which the sub address and the identification information of the user are associated with one another, associating the printing data with the identification information of the user and storing the printing data on a storage;
  (i) accepting authentication information input by the user at the image forming apparatus; and
  (j) in a case in which the user is authenticated based on the authentication information accepted in (i), forming an image based on the printing data associated with the identification information of the user and stored on the storage.

8. The control method of the image forming apparatus as claimed in claim 7, wherein:
  in (f), a network address of a sender of the job file is further associated with the sub address and the identification information of the user; and
  in a case in which the network address of the sender is associated with the sub address and the identification information of the user, in (h), the printing data is associated with the identification information of the user and stored on the storage.

9. A non-transitory computer readable storage medium storing a control program of an image forming apparatus connected to a network, the program causing the image forming apparatus to perform:
  (a) accepting authentication information input by a user at the image forming apparatus;
  (b) in a case in which the user is authenticated based on the input authentication information, allocating a sub address provided under a network address of the image forming apparatus to the user;
  (c) creating a job file including setting information related to performing a print job;
  (d) outputting the job file including the setting information along with destination information including the sub address and the network address to an external device operable by the user;
  (e) receiving the job file including the setting information and having the sub address as a destination, from the external device operated by the user;
  (f) in a case the job file including the setting information and having the sub address as a destination is received from the external device operated by the user, associating the sub address and identification information of the user with one another;
  (g) receiving printing data having the sub address as a destination;
  (h) in a case in which the sub address and the identification information of the user are associated with one another, associating the printing data with the identification information of the user and storing the printing data on a storage;
  (i) accepting authentication information input by the user at the image forming apparatus; and
  (j) in a case in which the user is authenticated based on the authentication information accepted in (i), forming an image based on the printing data associated with the identification information of the user and stored on the storage.

10. The non-transitory computer readable storage medium as claimed in claim 9, wherein:
  in (f), a network address of a sender of the job file is further associated with the sub address and the identification information of the user; and
  in a case in which the network address of the sender is associated with the sub address and the identification information of the user, in (h), the printing data is associated with the identification information of the user and stored on the storage.

* * * * *